Feb. 16, 1937.  E. G. JAQUES  2,070,735
HACKSAW SUPPORT AND GUIDE
Filed Oct. 28, 1935
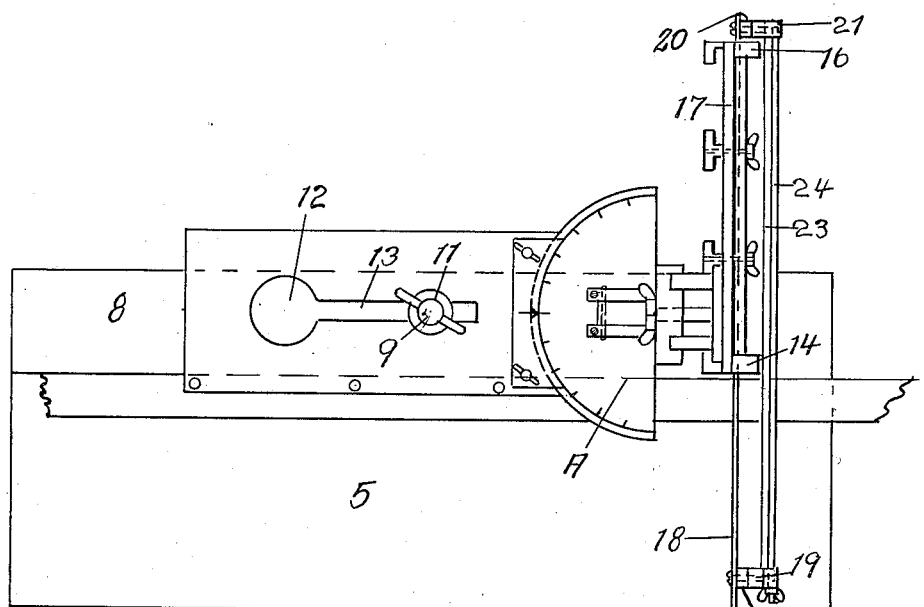
Fig.1.
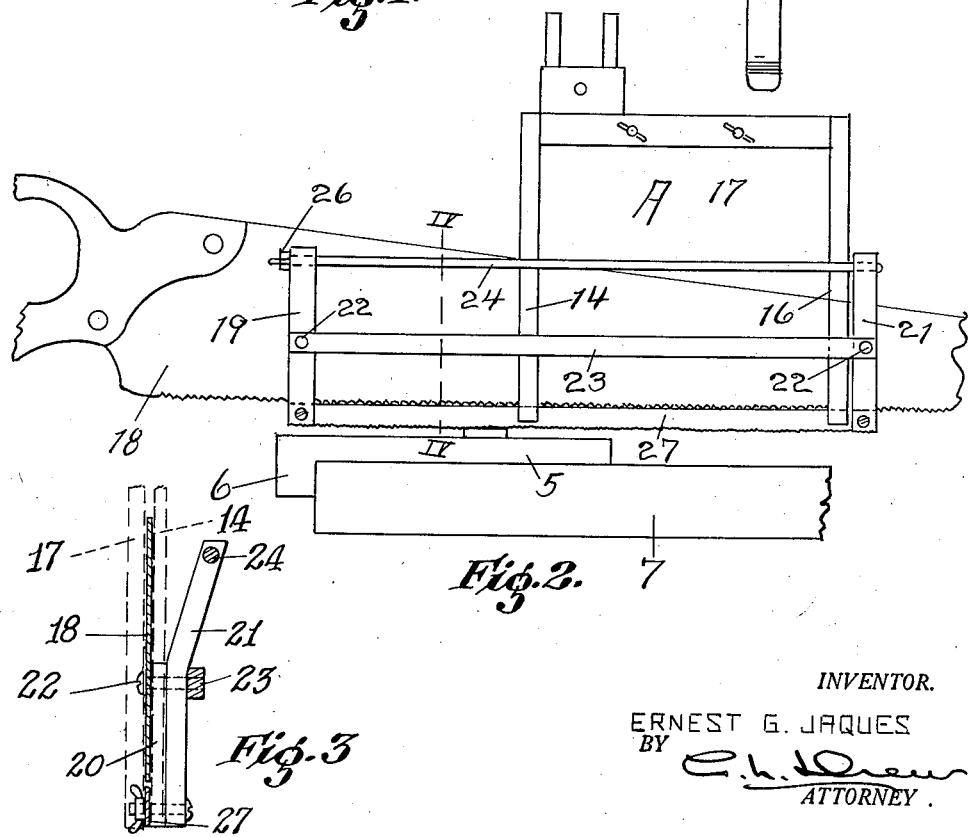
Fig.2.
Fig.3.
INVENTOR.
ERNEST G. JAQUES
BY
ATTORNEY.

Patented Feb. 16, 1937

2,070,735

UNITED STATES PATENT OFFICE 2,070,735

HACKSAW SUPPORT AND GUIDE

Ernest G. Jaques, San Francisco, Calif.

Application October 28, 1935, Serial No. 47,112

1 Claim. (Cl. 145—32)

This invention relates to improvements in hack saw supports and guide therefor.

The principal object of this invention is to provide means for attaching a hack saw blade to an ordinary carpenter's saw or similar supporting blade.

A further object is to provide means whereby a hack saw may be guided during the cutting operation, said guide being capable of angular adjustment so as to provide mitered joints.

A further object is to produce a device of this character which is simple in construction, economical to manufacture, compact, and one which may be readily transported in the customary tool kit.

A further object is to produce a device of this character which may be employed with my saw guide described in Patent No. 1,999,239 of April 30, 1935.

Other objects and advantages will be apparent during the course of the following description.

In the accompanying drawing forming a part of this specification and in which like numerals are employed to designate like parts throughout the same, Fig. 1 is a top plan view of a supporting block having my collapsible saw guide mounted thereon and supporting my invention;

Fig. 2 is an end elevation of Fig. 1;

Fig. 3 is an enlarged cross sectional view taken on the line 4—4 of Fig. 2.

The ordinary hack saw comprises a relatively narrow blade having its ends held and being placed under tension so as to bridge the space between the end clamps. The result of this construction is that such a blade may bend or flex when in use. Consequently, it is exceedingly difficult to make an accurate cut with a hand operated hack saw. Applicant has, therefore, devised means for employing a hack saw in a manner similar to an ordinary carpenter's saw, guiding the hack saw so as to prevent distortion thereof and confining the hack saw in a definite path whereby accurate cuts may be made.

In the accompanying drawing wherein for the purpose of illustration is shown a preferred embodiment of my invention, the numeral 5 designates a block having a stop 6 adapted to abut the edge of a bench or other work support 7. This block 5 has an upstanding member 8 which is provided with a stud 9 and wing nut 11. The upstanding member 8 serves to slidably support the base plate of my collapsible saw guide, described in the patent above mentioned. The stud 9 passes through an opening 12 and slides in a slot 13 in a manner which is obvious. My collapsible saw guide is designated as a whole by the letter A, and it is provided with guide fingers 14 and 16 which have their major portions spaced from the plate 17. My invention consists in attaching to a saw 18, which may be an ordinary carpenter's saw or a plain blade secured to a handle, a pair of spaced parallel members 19 and 21 which are also spaced from the saw blade 18 by spacer blocks 20. These members are attached to the saw blade by screws 22 about which they may pivot (see Fig. 3). A brace 23 extends between the members 19 and 21 while a rod 24 extends between the upper ends of the members 21 and 19 and has a wing nut 26, the purpose of which will later be described. A hack saw blade is shown at 27 which extends between the lower ends of the members 19 and 21 and by viewing Fig. 3 it will be noted that this blade 27 lies directly beneath and in the same plane as the blade 18. By tightening the thumb nut 26 the members 19 and 21 will pivot around the screws 22, thus placing tension upon the blade 27 and by placing the saw 18 and its attached blade 27 between the plate 17 and the guides 14 and 16 it will be apparent that the blade 27 will be held in perfect alignment thus enabling a person to employ a hack saw with the assurance that the cut will be accurate for whatever setting the apparatus is adjusted.

Thus it will be seen that I have produced a device which will perform all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In combination with a hand saw, a brace spaced from said saw and parallel thereto, pivot bolts extending through the ends of said brace and the blade of said saw, parallel members one mounted on each of said pivot bolts and between said saw and said brace, spacer blocks mounted on each of said bolts and in contact with said saw, the lower end of said spacer blocks and their adjacent parallel members being connected together, a second saw carried by said connected ends and lying in the same plane as said first mentioned saw, and means carried by the upper ends of said parallel members for tensioning said second mentioned saw.

ERNEST G. JAQUES.